Sept. 25, 1951        L. W. WATERS        2,569,207
PEAR PEELING APPARATUS
Filed Jan. 19, 1948        2 Sheets-Sheet 2

INVENTOR.
Lawrence W. Waters
BY
Mellin + Hanscom
ATTORNEYS

Patented Sept. 25, 1951

2,569,207

UNITED STATES PATENT OFFICE 2,569,207

PEAR PEELING APPARATUS

Lawrence W. Waters, Ontario, Calif., assignor to Atlas Imperial Diesel Engine Co., Oakland, Calif., a corporation of Delaware Application January 19, 1948, Serial No. 2,995

5 Claims. (Cl. 146—43)

This invention relates to fruit paring equipment and particularly pertains to an improved pear pealing apparatus.

One of the problems involved in providing a machine for peeling pears is that pears of different varieties and pears grown in different sections have different shape characteristics and also somewhat widely vary in size. Therefore, it is of importance to the canning industry that a pear peeling machine be produced which is capable of use in efficiently peeling pears regardless of size or shape characteristics.

It is the principal object of my present invention to provide an improved pear peeling apparatus which is readily capable of efficiently peeling pears of various sizes and of various shape characteristics.

It is a further object of my invention to provide a very efficient peeling mechanism for peeling pears which will conform itself substantially to the external contour of the fruit and peel the same with a minimum of waste.

One form which the invention may assume is exemplified in the following description and illustrated by way of example in the accompanying drawings, in which.

Figure 1:
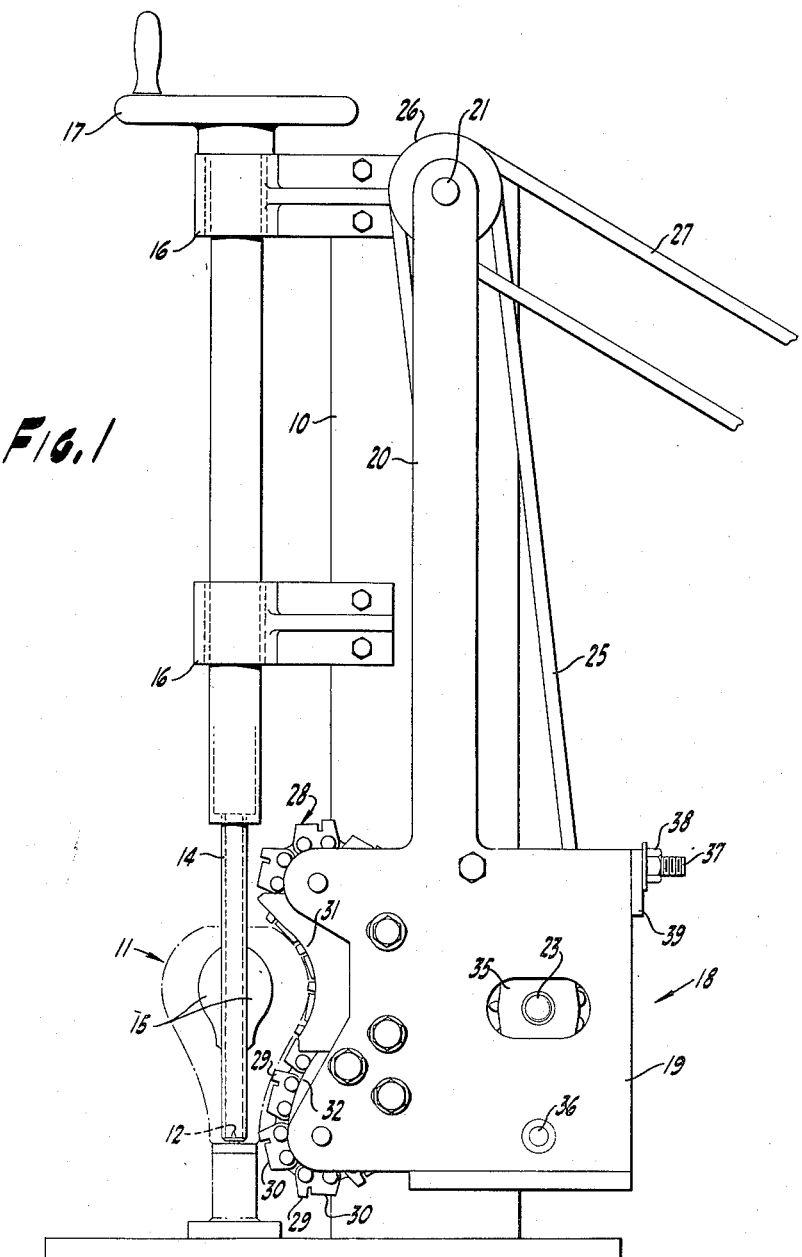
Fig. 1 is a view in side elevation of a pear peeling apparatus embodying the preferred form of my invention.
Figure 2:
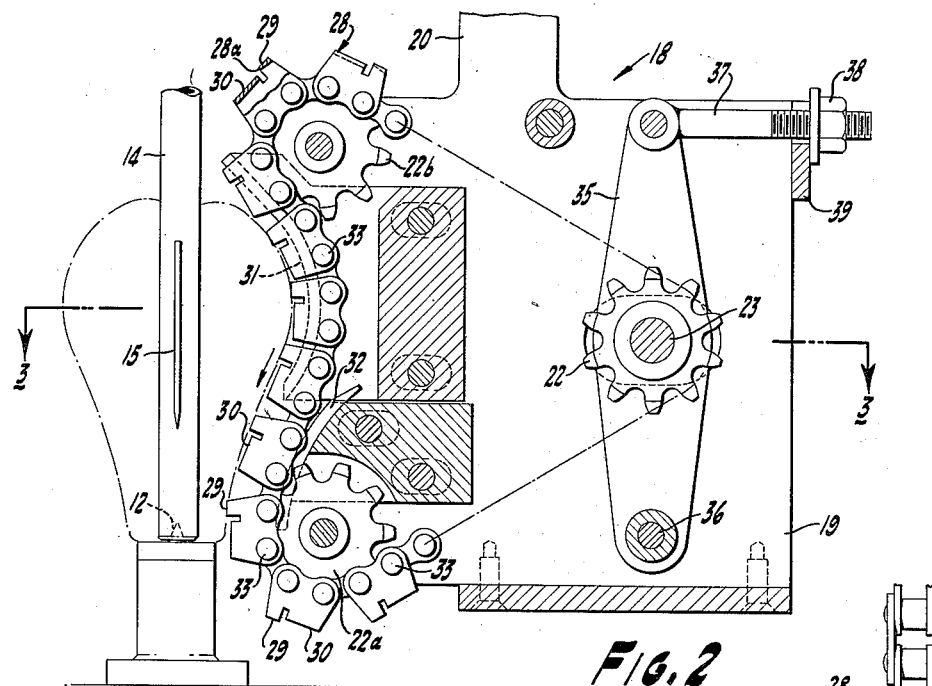
Fig. 2 is an enlarged view in section through the peeling head, disclosing the construction thereof.

Referring more particularly to the accompanying drawings, I there illustrate a pear peeling apparatus embodying my invention. Although herein the apparatus is described and claimed as a pear peeling mechanism, it is to be understood that it may have uses in peeling other fruits where somewhat analogous peeling problems are involved.

In the present instance, I have shown the device or mechanism designed as a partly manually operated machine, but I wish it understood that the mechanism may be incorporated in a machine in which all of the various operations in preparing the fruit for canning are mechanically performed.

The machine illustrated herein includes a suitable frame structure 10 having a pear mounting or gripping means 11, which includes a stationary impaling member 12 upon which the stem end of the fruit may be impaled to support it for penetration by a reciprocable member 14. This member 14, as shown, is a hollow semi-coring tube which is intended to penetrate coaxially through the calyx end of the pear and remove the calyx and the stem but not the seed pod. In accordance with my invention, however, other means of supporting the pear and coring the same may be employed, as it is only essential to my present invention that the pear be supported for rotation substantially about its longitudinal axis.

The semi-coring tube 14 has affixed thereon a pair of diametrically extending blades 15 which penetrate into the fruit with the semi-coring tube 14, so that rotation of the coring tube 14 will be accompanied by rotation of the pear substantially about its longitudinal axis. The member 14 is vertically reciprocable in a pair of guides 16 and is likewise rotatable in said guides. For the purpose of imparting rotation to the member 14 a hand wheel 17 is affixed to its upper end. In the operation of positioning a pear for peeling, the calyx and stem ends are bobbed and the stem end is impaled on the impaling member 12 so as to support the pear with its longitudinal axis substantially coaxially of the impaling member 12 and the member 14. The member 14 is then lowered to penetrate longitudinally through the pear and embed the blades or gripping members 15 therein. Thereafter, rotation of the member 14 through the medium of the hand wheel 17 will be accompanied by rotation of the pear.

I intend that the peeling of the pear be effected during the rotation thereof, and for this purpose I have provided a peeling mechanism 18 which comprises a peeling head 19 suspended by a lever 20 from a shaft 21. This enables the peeling head 19 to be swung toward and away from the pear mounted in the mounting and gripping means heretofore described. The movement of the peeling head is in a plane in alignment with the plane of the axis of a pear mounted for peeling, and in a direction perpendicular to that axis.

Mounted on the gripping head are three sprockets 22, 22a and 22b arranged at the apexes of an equilateral triangle. One of these sprockets is affixed on a shaft 23 also fitted with a fixed pulley 24. A drive is transmitted to the pulley 24 through the medium of an endless belt 25 and pulley 26 on the shaft 21, to which a drive is imparted by a belt 27.

Arranged over the sprockets 22 is an endless peeling member 28 of link-belt construction, so that it is flexible or deformable. Formed as a part of certain of the links of this endless peeling member 28 are cutting blades 29 and depth gauging members 30 so relatively arranged that the depth which the peeling blades 29 may cut into the fruit is limited. It will be noticed that the cutting edges 28a of the peeling blades are positioned at right angles to the path of travel of the member 28.

The endless member 28, due to its arrangement on the sprockets, as previously described, moves continuously in one direction in a closed path. A portion of this path, or that between the sprockets 22a and 22b, is conformed to substantially the external contour of the pear to be peeled supported in the mounting means previously described. For this purpose guide members 31 and 32 are provided which are engaged by the laterally projecting ends 33 of the pins which connect the links of the endless member together, so as to guide the endless member in the path conforming substantially to the longitudinal external contour of the pear from a point adjacent its calyx end to a point adjacent its stem end. It will be noticed, however, that for a major distance along this guided path the flexible or deformable endless member may move slightly away from the guide member 31 so that the cutting may conform more closely to the contour of the pear.

The guide members 31 and 32 are each adjustably mounted on the peeling head 19, as illustrated. That is to say, they may be adjusted toward and away from the axial center of the pear in a direction perpendicular to that axis. Likewise, guide members 31 and 32 of different contours may be provided for substitution in order that pears of widely different contours may be accommodated in the machine.

The shaft 23 which carries the sprocket 22 and the pulley 24 is adjustable in a direction perpendicular to its axis, in that it is mounted or journaled intermediate the ends of a pair of aligned levers 35 pivoted at one end to the peeling head as at 36. The other end of the levers 35 are adjustably secured to the head by means of a link 37 and a nut 38 engaging a bifurcated member 39 formed as a fixed part of the head 19. Obviously, by adjusting the position of the levers 35, by loosening or tightening the nut 38, the distance between the centers of the three sprockets may be increased or lessened to accommodate paths of different lengths through which the endless member travels over the contour of the pear, as previously described.

Figure 5:
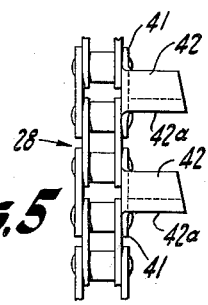
Fig. 5 is a view in front elevation of a modified cutting member of the apparatus.
Figure 3:
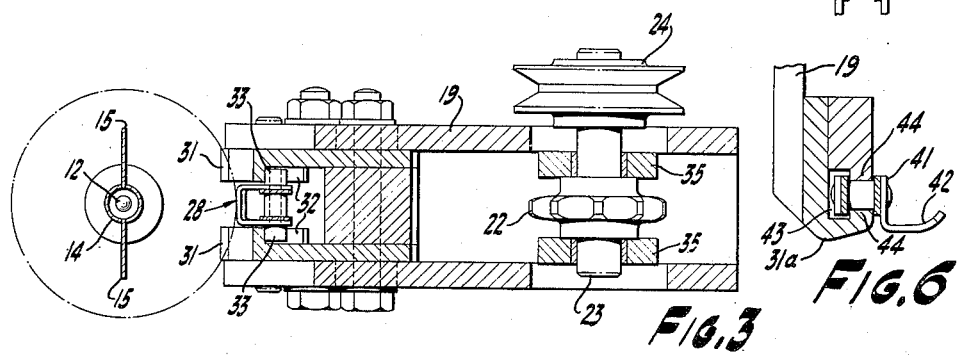
Fig. 3 is a transverse sectional view through the peeling head taken on line 3—3 of Fig. 2.
Figure 6:
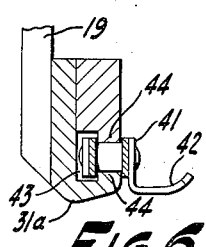
Fig. 6 is a transverse cross section through the modified cutting member showing also the guide member therefor.
Figure 4:
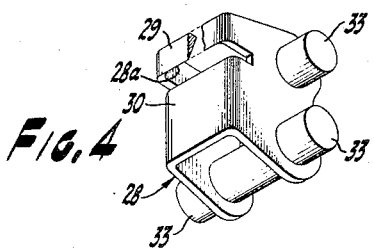
Fig. 4 is a perspective view of the cutting and gauging members of the apparatus.

In Figs. 5 and 6 there is shown a modified form of cutting member in which alternate links 41 on one side of the chain 28 extend outwardly from the chain to form a curved peeling blade 42 having a cutting edge 42a. The chain 28 is carried by a guide member 31a, which is adjustably secured to the peeling head 19 to conform to the shape and size of the pear. The guide member 31a is provided with a T-shaped channel 43 and flanges 44 to receive and carry the chain 28, as shown. This form of cutting member obviates a difficulty sometimes encountered, in that the cutting member sometimes becomes clogged with peelings.

From the foregoing it is obvious that I have provided an improved and simplified pear peeling machine which is capable of efficiently peeling pears regardless of size or shape characteristics.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A pear peeler comprising mounting and rotating means for mounting a pear and rotating the same substantially about its longitudinal axis, peeling means to traverse longitudinally of the exterior of the pear during its rotation to effect peeling thereof, said peeling means comprising a peeler head, a driven endless deformable member mounted on the head for movement continuously in one direction in a closed path, guide means for guiding said member through a portion of its path in a manner substantially conforming said member to the external longitudinal contour of a pear in the mounting means from a point adjacent its calyx end to a point adjacent its stem end, peeling blades carried by said member to engage the pear to peel the same as the latter is rotated, gauging means on said member to gauge the depth of cut of the peeling blades.

2. A pear peeler comprising gripping means for gripping the pear and rotating the same about its longitudinal axis, peeling means to traverse longitudinally of the exterior of the pear during its rotation to effect peeling thereof, said means comprising a peeler head movable in a direction substantially perpendicular to the axis of rotation of the pear toward and away from the pear in the gripping means, a driven endless belt-like deformable member mounted on the head for movement continuously in one direction in a closed path, guide means for guiding said member through a portion of its path to conform the same substantially to the external longitudinal contour of a pear in the gripping means from a point adjacent its calyx end to a point adjacent its stem end, peeling blades carried by said member to engage the pear to peel the same as it is rotated, gauging means on said member to gauge the depth of cut of the peeling blades.

3. A pear peeler comprising means for receiving a pear and rotating the same about its longitudinal axis, peeling means to traverse longitudinally of the exterior of the pear during its rotation to effect peeling thereof, said peeling means comprising a peeler head mounted to swing in a plane in alignment with the axis of rotation of the pear and in a direction substantially perpendicular to such axis, a driven endless flexible member mounted on the head for movement continuously in one direction in a closed path, guide means on the head engaging the endless member for guiding a portion of said member through a portion of its path of travel so as to conform substantially to the longitudinal external contour of a pear from a point adjacent its calyx end to a point adjacent its stem end, spaced peeling blades on the endless member, and gauging means on the endless member cooperating with the peeling blades to gauge the depth of cut of the peeling blades.

4. A pear peeler comprising means for supporting a pear and rotating the same substantially about its longitudinal axis, peeling means to traverse longitudinally over the exterior of the pear during its rotation to effect peeling thereof, said peeling means comprising a peeler head, rotatable sprockets carried by the head, an endless sprocket chain engaging the sprockets to be driven thereby continuously in one direction, a portion of said chain between sprockets travelling in a path substantially conforming to the external longitudinal contour of the pear from a point adjacent its calyx end to a point adjacent its stem end, peeling blades carried by said chain at spaced points therealong to engage the pear and peel the same, and gauge means carried by the chain in operative relation to the blades to limit the depth of cut of said blades.

5. A pear peeler comprising means for receiving a pear and rotating the same about its longitudinal axis, peeling means to traverse longitudinally of the exterior of the pear during its rotation to effect peeling thereof, said peeling means comprising a peeler head mounted to swing in a plane in alignment with the axis of rotation of the pear and in a direction substantially perpendicular to such axis, a driven endless flexible member mounted on the head for movement continuously in one direction in a closed path, guide means on the head engaging the endless member for guiding a portion of said member through a portion of its path of travel so as to conform substantially to the longitudinal external contour of a pear from a point adjacent its calyx end to a point adjacent its stem end, means for changing the guide means to conform to pears of different shape characteristics, spaced peeling blades on the endless member, and gauging means on the endless member cooperating with the peeling blades to gauge the depth of cut of the peeling blades.

LAWRENCE W. WATERS.

REFERENCES CITED

The following references are of record in the file of this patent:

UNITED STATES PATENTS

| Number | Name | Date |
|---|---|---|
| 175,772 | Silverthorn | Apr. 4, 1876 |
| 516,091 | Hargrave | Mar. 6, 1894 |
| 1,729,190 | Secondo | Sept. 24, 1929 |
| 1,937,073 | Stone | Nov. 28, 1933 |
| 2,446,774 | Mall | Aug. 10, 1948 |
| 2,448,229 | McDowell | Aug. 31, 1948 |

FOREIGN PATENTS

| Number | Country | Date |
|---|---|---|
| 360,431 | Italy | June 21, 1938 |